United States Patent [19]

Chappell

[11] Patent Number: 4,884,883
[45] Date of Patent: Dec. 5, 1989

[54] SPECTACLE FRAME HAVING REMOVABLE DECORATIVE ELEMENTS

[76] Inventor: Norman W. Chappell, 95 Hainault Road, Chigwell, Essex, Great Britain

[21] Appl. No.: 205,350

[22] Filed: Jun. 10, 1988

[30] Foreign Application Priority Data

Feb. 27, 1987 [GB] United Kingdom ................. 8704656

[51] Int. Cl.$^4$ .............................................. G02C 11/02
[52] U.S. Cl. ...................................................... 351/52
[58] Field of Search ..................................... 351/51, 52

[56] References Cited

U.S. PATENT DOCUMENTS 2,555,578 6/1951 Davis ..................................... 351/52
2,842,028 7/1958 Belgard ................................. 351/52

FOREIGN PATENT DOCUMENTS 273731 5/1951 France ................................... 351/52
1281916 12/1961 France ................................... 351/52

Primary Examiner—Rodney B. Bovernick
Attorney, Agent, or Firm—Oliff & Berridge

[57] ABSTRACT

A spectacle frame 2 is fitted with separately formed decorative parts 5. Each part 5 has a short dovetail projection 6 to engage a mating recess in the frame and is bowed to be resiliently flattened against the frame on fitting.

3 Claims, 2 Drawing Sheets

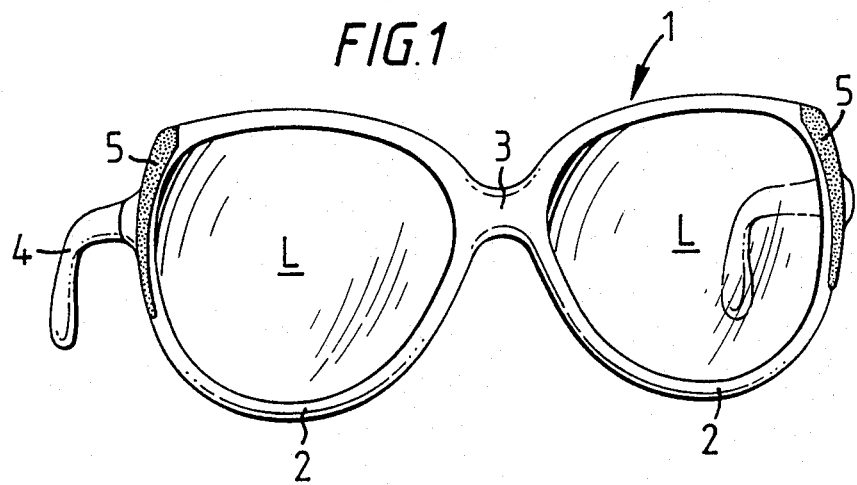
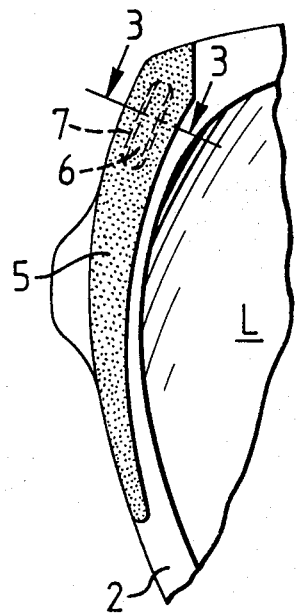
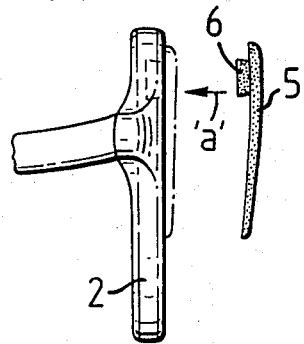
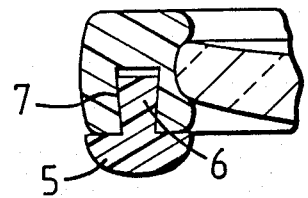

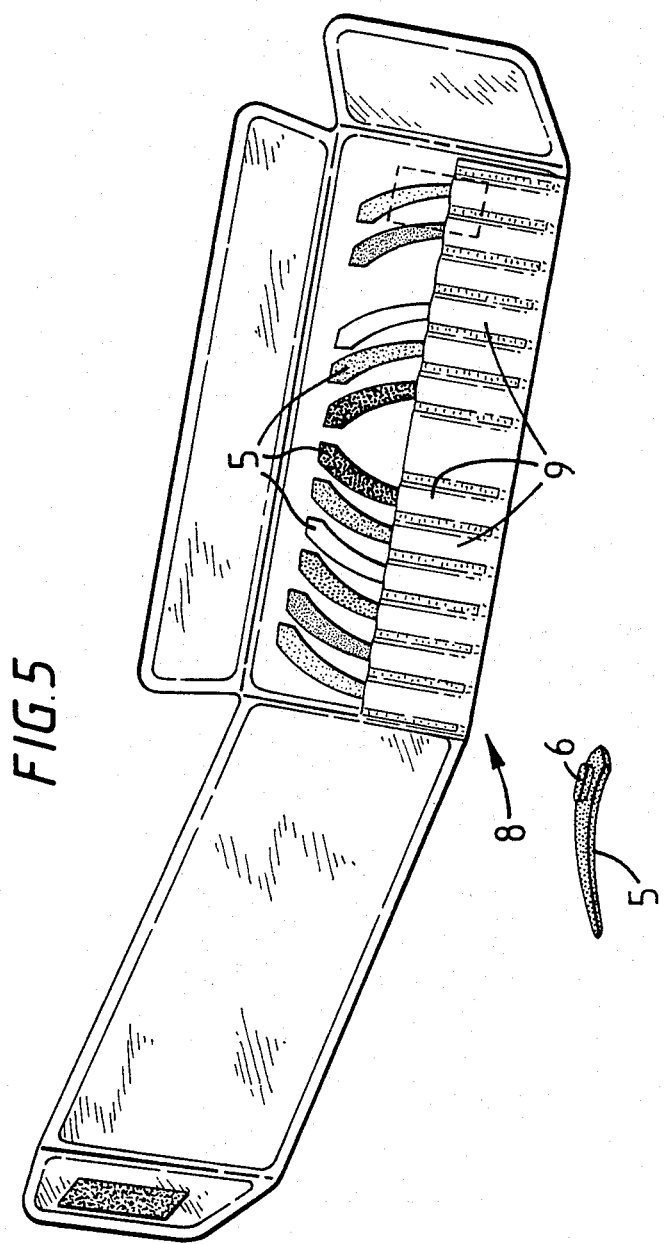

SPECTACLE FRAME HAVING REMOVABLE DECORATIVE ELEMENTS

DESCRIPTION

This invention relates to spectacle frames and, more particularly, to a spectacle frame bearing separately formed decorative parts.

The provision on a spectacle frame of removable decorative parts has been proposed. It has also been proposed to provide a selection of different decorative components, each adapted to co-operate with a spectacle frame.

According to my British Pat. No. 2,159,174 an elongate decorative component is located in a corresponding elongate groove of the same length and breadth as the decorative compartment. Hence the groove is often visible, detracting from the appearance of the spectacle frame. Moreover decorative component can only be located along and over a part of the spectacle frame wide enough to accommodate the receiving groove.

According to one aspect of the present invention, there is provided a spectacle frame having a removable decorative part wherein the said part has a rearwardly extending projection resiliently to engage a groove in the frame characterised in that the projection and said groove are short relatively to the decorative part and in that the decorative part is bowed so as to be deformed flat on fitting on the frame.

In accordance with another aspect of the invention there is provided a spectacle frame having a removable decorative part located by a groove formed in the spectacle frame, which groove tapers outwardly from the surface of the frame in transverse cross-section, characterised in that the decorative part includes a projection having a dove-tailed cross-section complementary to that of the groove and arranged to engage in the groove and a further portion, which is of greater length and width than the groove opening.

The invention will now be described by way of illustration and with reference to the accompanying drawings wherein:

FIG. 1 is a front view of a pair of spectacles incorporating the frame of the present invention.

FIG. 2 is an enlarged detail of one corner of the spectacles showing the applied decorative part;

FIG. 3 is a section on the line 3—3 of FIG. 2;

FIG. 4 is a side view showing the decorative part being applied;

FIG. 5 shows a number of replacement decorative parts in a wallet.

Referring initially to FIG. 1 of the drawings a pair of spectacles comprises a frame 1 made up of lens-carrying parts 2 linked by a bridge 3, and ear-engaging limbs 4 hingedly connected to the parts 2. Thus far the frame 1 is conventional and functions in a known manner. The frame 2 may be formed of plastics, or other suitable material and be styled in any appropriate manner; as will subsequently be explained the present invention allows decorative parts to be applied to spectacles of a wide range of styles. The spectacles illustrated have a frame of the present invention with fitted lenses L.

Clip-on decorative parts or wings 5 are provided one on each outer front surface of the frame 1. Each part 5 comprises a strip of resiliently flexible plastic material, typically a polyamide resin, the strip having as shown in FIG. 4 a shallow convexity for reasons which will be described. The profile of each strip 5 is, as is well shown in FIG. 2, shaped at one side to register with the outer part of the spectacle frame when appropriately positioned, and at the other side to provide a pleasing line and angle against the background of the frame proper. The strip will typically be of a colour to contrast with the inherent colour of the spectacle frame. Each strip is flat at the rear closely to engage the frame front surface and curved at the front to provide an attractive appearance. The flat rear surface of each part 5 has a projection 6 of dovetail form, to be received in a corresponding dovetail groove 7 in the frame 2. 'Dovetail', as applied to the projection, may be characterised as having a reverse taper to provide a re-entrant part adjacent the frame proper. The length of each projection is short in comparison with that of the part as a whole.

To engage the spectacles the part 5 is pressed in the direction of arrow 'a' as shown in FIG. 4, the projection 6 being resiliently deformed to enter and fit tightly the mating groove 7. On this fitting the part 5 is flattened to remove the convexity shown in FIG. 4 and is thus resiliently urged against the frame surface. The forces thus developed and friction hold the part 5 firmly against lateral shifting. This permits a short dovetail interconnect to locate a relatively long strip. The strip can be removed by outward force causing the required resilient deformation of projection 7.

Thus an advantage of the present arrangement in comparison with known arrangements is that only a relatively small area of the frame has to be wide enough to receive the groove 7. Where an elongate recess is provided there has to be a wide part of the frame of substantial length. Although wings 5 are illustrated fitting the outer corners of the frame the parts 5 can be positioned elsewhere, for example across the bridge. The short projection 6 with the ability of the part 5 to fit closely and firmly gives exceptional versatility in positioning.

The decorative part 5 may be considered to comprise a relatively short portion carrying the interconnecting part, the projection 6 and a further portion of greater width and length which provides the decorative surface. The projection and groove 7 are thus not visible when the part 5 is fitted (FIG. 1). This can well be appreciated from FIG. 2 where the projection and groove are shown in broken form. To ensure that the interconnecting parts are not visible from the front the parts 5 are preferably fabricated so as to be opaque.

FIG. 4 shows a custom-built wallet 8 with individual pockets 9 holding parts or wings 5 in pairs, each pair being of a different colour. The wearer can thus select the colour combination for the spectacle frame to choice.

I claim:

1. A spectacle frame having a removable decorative part located by a groove formed in the spectacle frame which groove tapers outwardly from the surface of the frame in transverse cross-section, and being characterised in that the decorative part includes: a projection having a dovetailed cross-section complementary to that of the groove and arranged to engage in the groove; and a further portion which is of greater length and width than the groove opening and is bowed so as to be deformed flat on fitting the decorative part to the frame by engagement of the projection in the groove.

2. A spectacle frame as claimed in claim 1, characterised in that the projection is formed from a material of sufficient resilience to render the projection insertable into the groove through resilient deformation of the projection.

3. A spectacle frame as claimed in claim 2, characterised in that the groove is located on the front face of the frame and the decorative part is arranged to cover a portion of said front face.

* * * * *